(12) United States Patent
Huang et al.

(10) Patent No.: US 6,402,032 B1
(45) Date of Patent: *Jun. 11, 2002

(54) INTEGRATED SMART CARD READER AND COMPUTER INPUT/OUTPUT IC SYSTEM

(75) Inventors: Steven Huang, Taipei; Scott Lin, Taichung Hsien, both of (TW)

(73) Assignee: Integrated Technology Express Inc., Hsinchu (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,591

(22) Filed: Nov. 9, 1999

(30) Foreign Application Priority Data

Dec. 3, 1998 (TW) .......................................... 87120063

(51) Int. Cl.[7] .................................................. G06K 7/06
(52) U.S. Cl. ...................... 235/441; 235/492; 235/486; 235/380; 235/382; 235/379
(58) Field of Search ................................ 235/380, 441, 235/492, 485, 382, 379

(56) References Cited

U.S. PATENT DOCUMENTS

| | | | |
|---|---|---|---|
| 5,149,945 A | * 9/1992 | Johnson et al. | 235/380 |
| 5,472,351 A | * 12/1995 | Greco et al. | 235/492 |
| 5,486,687 A | * 1/1996 | Le Roux | 235/382 |
| 5,500,517 A | * 3/1996 | Cagliostro | 235/486 |
| 5,664,157 A | * 9/1997 | Takahira et al. | 235/492 |
| 5,739,515 A | * 4/1998 | Takemura | 235/441 |
| 5,752,857 A | * 5/1998 | Knights | 235/380 |
| 5,841,868 A | * 11/1998 | Helbig, Sr. | 235/380 |
| 5,844,497 A | * 12/1998 | Gray | 235/380 |
| 5,850,103 A | * 12/1998 | Takemura | 439/260 |
| 5,877,488 A | * 3/1999 | Klatt et al. | 235/486 |
| 5,902,991 A | * 5/1999 | Kumar | 235/492 |
| 5,969,333 A | * 10/1999 | Barthelemy et al. | 235/492 |
| 6,069,795 A | * 5/2000 | Klatt et al. | 235/492 |
| 6,145,747 A | * 11/2000 | Wu | 235/486 |
| 6,149,058 A | * 11/2000 | Albaret | 235/380 |
| 6,268,788 B1 | * 7/2001 | Gray | 235/380 |

* cited by examiner

Primary Examiner—Karl D. Frech
Assistant Examiner—Uyen-Chau N. Le
(74) Attorney, Agent, or Firm—J. C. Patents

(57) ABSTRACT

A system that integrates the function of a computer input/output integrated circuit (IC) and a smart card reader. The integrated system includes a computer input/output IC and a reading device. The system is capable of eliminating interface problems resulting from non-standardized hardware in addition to a reduction in production cost and an improvement in working stability.

12 Claims, 4 Drawing Sheets

INTEGRATED SMART CARD READER AND COMPUTER INPUT/OUTPUT IC SYSTEM

CROSS-REFERENCE TO RELATED APPLICATION

This application claims the priority benefit of Taiwan application serial no. 87120063 filed Dec. 3, 1998, the full disclosure of which is incorporated herein by reference.

BACKGROUND OF THE INVENTION

1. Field of Invention

The present invention relates to an integrated smart card reader and computer input/output (I/O) integrated circuit (IC) system. More particularly, the present invention relates to an integrated system capable of reading both smart card data and computer input/output data.

2. Description of Related Art

Due to progress in technologies, many inventions capable of simplifying the transaction in our everyday life have been introduced. Card for storing personal information such as credit card, payment card and financial card are good examples. Following the many breakthroughs in computer technology, a card known as a smart card has recently been introduced. Since the storage capacity of each smart card is quite large, almost any personal data can be stored inside.

At present, although smart cards (such as citizenship cards, multifunction credit cards) are being promoted, non-standardized card reader hardware renders interface equipment expensive. FIG.1 is a block diagram showing the architectural layout of a conventional card reader. As shown in FIG. 1, a card reader 120 and a computer input/output (I/O) integrated circuit (IC) 100 are integrated together so that card information can be processed. When a smart card 130 is inserted into the card reader 120, relevant information inside the smart card 130 can be extracted by a smart card interface integrated circuit 124 within the card reader. As soon as card information is read by the interface IC 124, the data 125 is transferred from the interface IC 124 to a microprocessor 125. The microprocessor 125 next transforms the data 125 into an input signal 111 and transmits to a computer input/output (I/O) integrated circuit (IC) 110. The input signal 111 must be in a suitable format such as a floppy disk, a keyboard, a mouse, a serial port or a parallel port interface. In other words, the input signals 111 must be in a format acceptable by the computer device 10.

In implementation of the smart card reading system, a card reader 120 must be purchased in addition to the original computer 10. Due to the non-standardization of hardware interface, different types of card readers have to be purchased to fit computers having different types of hardware architectures. Such an arrangement not only is inconvenient to the users, but also increases cost of implementation, which is a big drawback for commercially promoting smart card system.

SUMMARY OF THE INVENTION

The present invention provides an integrated system capable of reading both a smart card and computer input/output data.

A second object of this invention is to provide an integrated system capable of reading a smart card and performing a computer input/output function. The system is compatible with current integrated circuit technologies and yet is able to lower the cost of implementing a smart card system.

A third object of this invention is to provide an integrated system capable of reading a smart card and performing a computer input/output function that can tackle the problems resulting from a non-standardized hardware interface with a card reader.

To achieve these and other advantages and in accordance with the purpose of the invention, as embodied and broadly described herein, the invention provides an integrated system for reading smart card data and performing computer input/output function. The smart card contains data that can be transmitted as electrical signals. The integrated system includes a reading device and a computer input/output (I/O) integrated circuit (IC). The reading device is a device that can couple with a smart card. The reading device is capable of picking up signals from the smart card and transferring to the computer I/O IC. The computer I/O IC is coupled to the reading device for receiving smart card signals from the reading device. After some internal processing by the computer I/O IC, the processed smart card data are re-transmitted to some other computer systems for further processing.

The reading device of the integrated system further includes a connection device and a distribution circuit. The connection device has a plurality of contact points for engaging with and electrically connecting to corresponding contact points on a smart card. The matching circuit is coupled to both the connection device and the computer I/O IC for connecting the contact points on the smart card via the connection device to the computer I/O IC.

The computer I/O IC of the integrated system includes a plurality of terminals for electrically connecting to a corresponding contact point on the smart card, via the connection device and the matching circuit.

The aforementioned integrated system has at least the following advantages, including:

A lower production cost is provided and improved reading stability is achieved. After circuit integration, the reading device is greatly simplified and conversion processing inside a conventional card reader is unnecessary. Hence, accessory components and circuits are greatly reduced, and cost of production is decreased while reading stability is improved.

Interface incompatibility is improved. A conventional card reader communicates with and input/output IC by means of a floppy disk interface, a keyboard and mouse interface, or a serial port or parallel port interface. Hence, signal conversion incompatibility may occur. Since the integrated system permits direct communication between the computer I/O IC and the smart card without an intermediate interface, incompatibility problems can be reduced to an absolute minimum.

It is possible to read card functions by the central processing unit (CPU) of a computer. Through the computer I/O IC, the CPU of a computer is capable of providing more card reading functions than a conventional card reader.

The computer I/O IC of the integrated system further includes a signal conversion and control device and a signal-processing device. The signal conversion and control device is connected to some contact points on the smart card for reading signals from the smart card and then converting the signals to converted smart card signals. The signal-processing device is coupled to the signal conversion and control device for receiving the converted smart card signals. After some processing to decode the stored data, the signals are converted into readable smart card signals.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
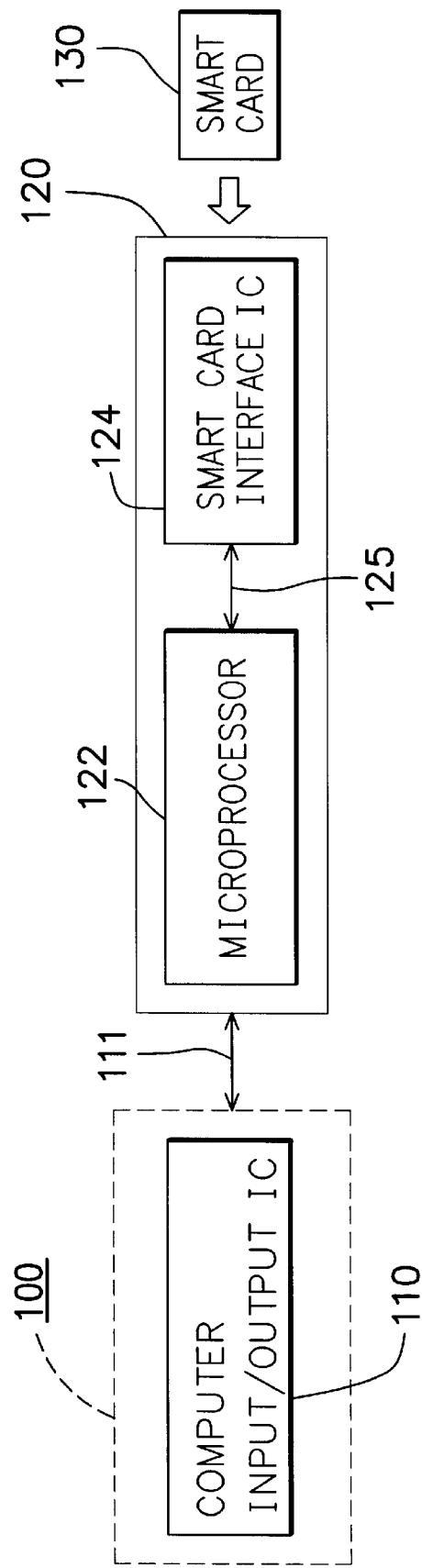
FIG.1 is a block diagram showing the architectural layout of a conventional card reader.

Reference will now be made in detail to the present preferred embodiments of the invention, examples of which are illustrated in the accompanying drawings. Wherever possible, the same reference numbers are used in the drawings and the description to refer to the same or like parts.

Figure 2:
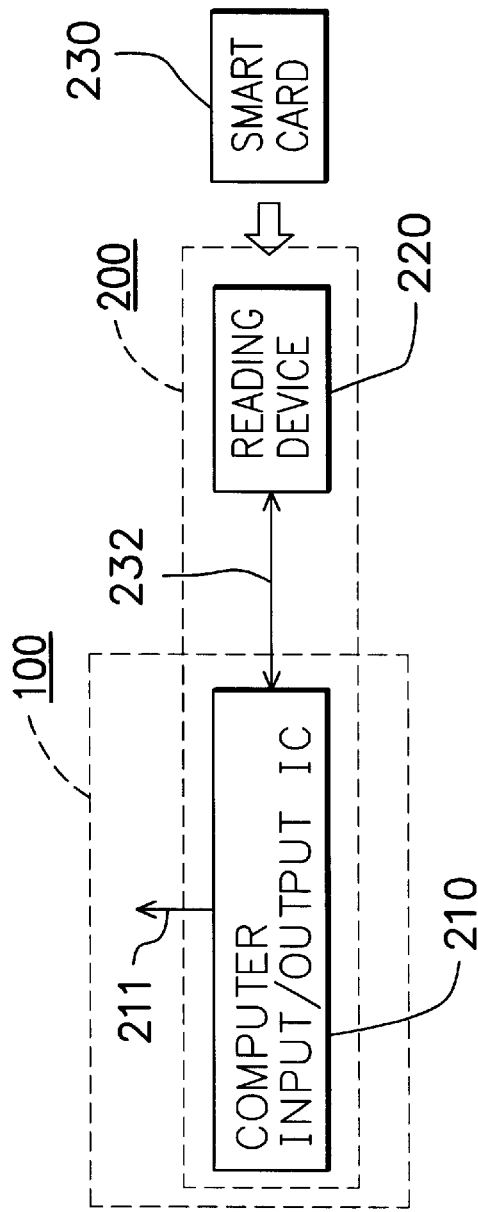
FIG. 2 is a block diagram showing the architectural layout of a computer I/O IC and smart card reader integrated system according to a first embodiment of this invention.

FIG. 2 is a block diagram showing the architectural layout of a computer I/O IC and smart card reader integrated system according to a first embodiment of this invention. The integrated system 200 includes a computer input/output (I/O) integrated circuit (IC) 210 and a reading device 220. After a smart card 230 is inserted into the reading device 220, the reading device 220 is electrically connected with various contact points on the smart card 230. The reading device 220 is able to extract data from the smart card 230 and transmit smart card signals 232 to the computer I/O IC. The main difference between the reading device 220 and a conventional card reader is that the reading device 220 only contains a simple matching circuit and some mechanical connection devices for engaging with a smart card. Hence, problems due to the non-standardization of hardware interface are eliminated while cost of production is lowered. Furthermore, aside from the original computer I/O function, the computer I/O IC 210 is capable of processing the smart card signal 232 and then outputting smart card signals 211 to other computer system 100.

The reading device 220 of the integrated system 200 has a relatively simple architecture. In addition, the smart card signal processing capability of the computer I/O IC 210 can be easily implemented using the current IC fabrication techniques with only limited increase in cost of production. Moreover, chip area can be reduced by employing existing semiconductor fabrication technologies so that a small and lightweight package can be obtained.

Figure 3:
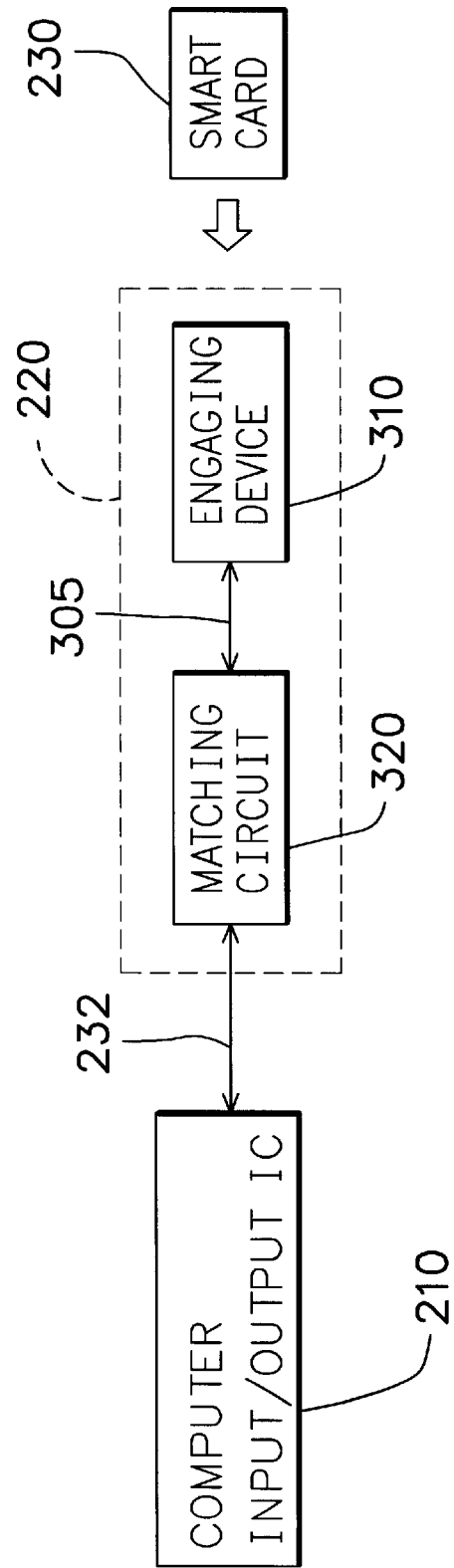
FIG. 3 is a block diagram showing one embodiment of the hardware structure of the reading device shown in FIG. 2.

FIG. 3 is a block diagram showing one embodiment of the hardware structure of the reading device shown in FIG. 2. As shown in FIG. 3, the reading device 220 comprises an engaging device 310 and a matching circuit 320. The engaging device 310 is a simple mechanical device for coupling with a smart card 230. For example, the engaging device 310 is a cartridge that couples the contact points on the smart card 230 with the engaging device so that smart card signals 305 can be transferred to the matching circuit 320. The matching circuit 320 serves as a bridge between the reading device 220 and the computer I/O IC 210 so that smart card signals 232 can be smoothly transmitted to the computer I/O IC 210. The matching circuit 320 can be implemented using a plurality of resistors.

In summary, the integrated system 200 has advantages including:

1. The lowering of production cost and improved reading stability: A circuit integration, the reading device is greatly simplified and conversion processing inside a conventional card reader is unnecessary. Hence, accessory components and circuits are greatly reduced in number, and cost of production is decreased while reading stability is improved.

2. Reduction of interface incompatibility: A conventional card reader communicates with input/output IC by means of floppy disk interface, keyboard and mouse interface, serial port or parallel port interface. Hence, signal conversion incompatibility may occur. Since the integrated system permits direct communication between the computer I/O IC and the smart card without an intermediate interface, incompatibility problems can be reduced to an absolute minimum.

3. Card reading functions by the central processing unit (CPU) of a computer are possible: Through the computer I/O IC, the CPU of a computer is capable of providing more card reading functions than a conventional card reader.

Figure 4:
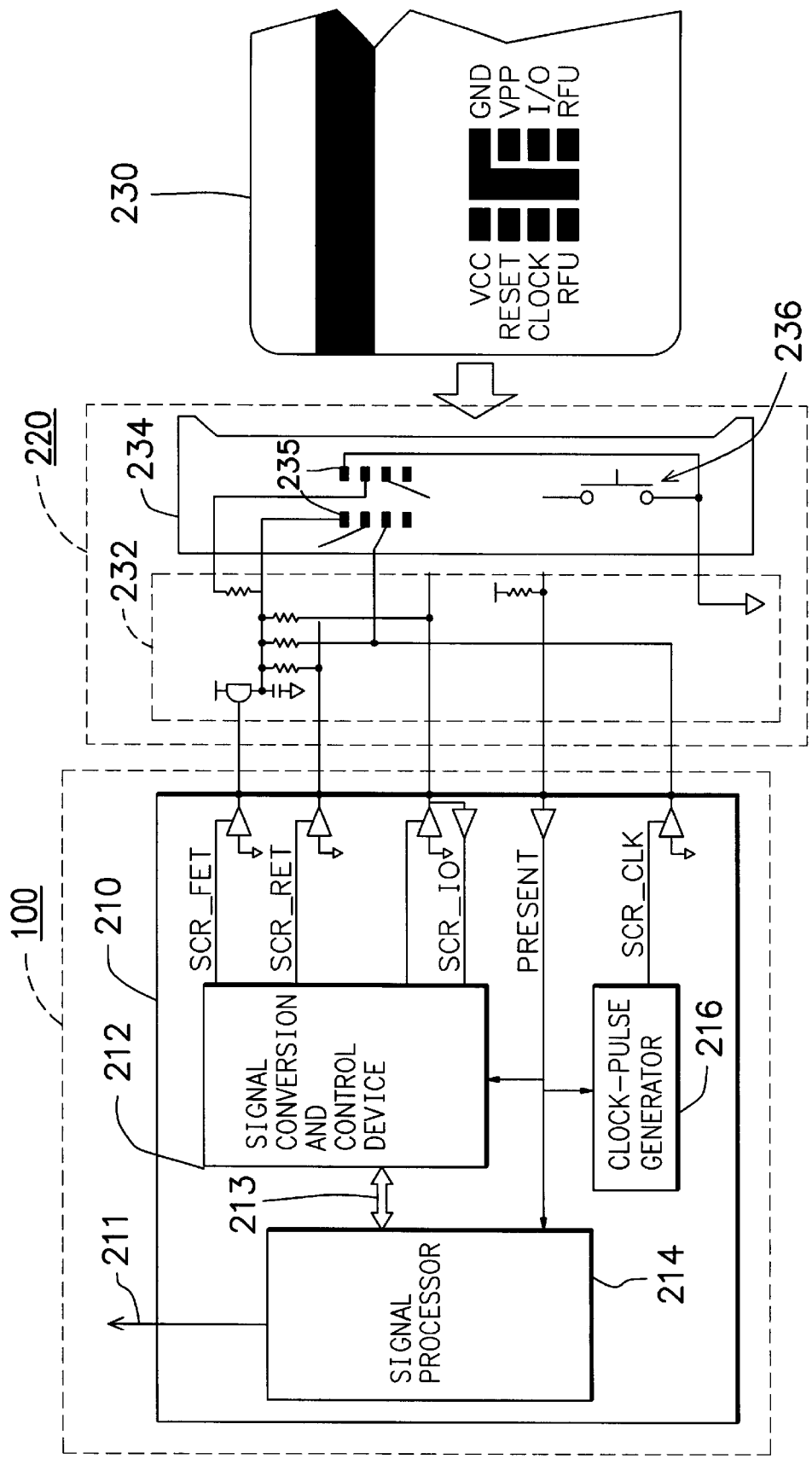
FIG. 4 is a diagram showing an actual circuit implementation of the integrated system as shown in FIG. 2.

FIG. 4 is a diagram showing an actual circuit implementation of the integrated system as shown in FIG. 2. The circuit in FIG. 4 serves as an example, only. Anyone familiar with the circuit designs may understand that different combinations of electronic devices can be used to implement the integrated system all within the scope of this invention. As shown in FIG. 4, the reading device 220 includes an engaging device 234 and a matching circuit 232. The engaging device 234 has a plurality of contact points 235. The computer I/O IC 210 includes a signal conversion and control device 212, a signal processor 214 and a clock pulse generator 216.

The smart card 230 has a plurality of contact points such as VCC, RESET, CLOCK, GND, VPP and I/O. After the smart card 230 is inserted into the engaging device 234, the contact points on the smart card 230 are electrically connected to the corresponding contact points 235 in the engaging device 234. The terminals SCR_FET, SCR_RST, SCR_IO and SCR_CLK of the computer I/O IC 210 are coupled to the matching circuit 232 and are connected to the smart card 230 through the contact points 235.

The signal conversion and control device 212 of the computer I/O IC 210 is coupled to the SCR_FET, the SCR_RST and the SCR_IO terminals. Through the terminal SCR_FET, voltage supplied to the terminals Vcc and Vpp on the smart card 230 can be controlled. Through the SCR_RST terminal, the smart card 230 can be reset. Through the SCR_IO terminal, data within the smart card 230 can be accessed. When the conversion and control device 212 receives data from the smart card 230, converted smart card signals 213 are forwarded to the signal processor 214.

Through a PRESENT terminal, the signal processor 214 within the computer I/O IC 210 is connected to a switch 236 inside engaging device 234. As soon as the smart card 230 is inserted into the engaging device, the switch 234 is flipped so that the PRESENT terminal is connected to ground, indicating the presence of the smart card 230. The signal processor 214 is also capable of receiving the converted smart card signals 213 from the signal conversion and control device 212 and transforming the signals into smart card read signals 211. Smart card data in the form of smart card read signals 211 can then be sent to another computer system 100 for further processing. Through the SCR_CLK terminal, the clock pulse generator 216 of the computer I/O IC 210 provides operating pulses to the smart card 230.

Figure 5:
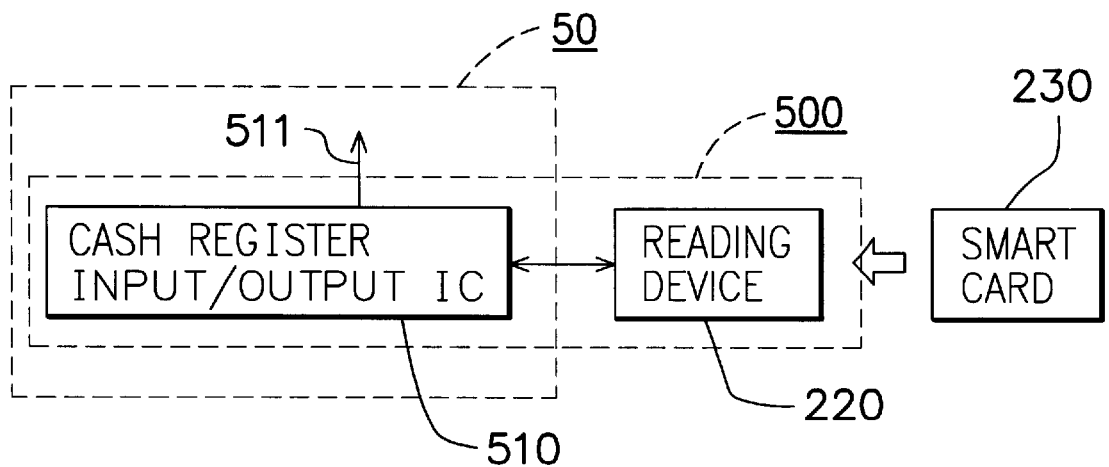
FIG. 5 is a block diagram showing the architectural layout of a cash register I/O IC and a smart card reader integrated system according to a second embodiment of this invention.

FIG. 5 is a block diagram showing the architectural layout of a cash register I/O IC and a smart card reader integrated system according to a second embodiment of this invention. As shown in FIG. 5, the integrated system 500 is mainly used for registering the payments to a cash register 50. The cash flow input/output (I/O) integrated circuit (IC) 510 is functionally very similar to the computer I/O IC in the first embodiment of this invention. The cash flow I/O IC 510 is capable of reading data from the smart card 230 and then outputting smart card read signals 511 to the cash register 50. In this embodiment, a reading device 200 composed of a simple matching circuit and an engaging device is also used. The second embodiment illustrates that the integrated system of this invention can be applied to a cash register, and hence area of application of a smart card is further expanded.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An integrated smart card reader and computer input/output (I/O) integrated circuit (IC) system for reading smart card signals from a smart card, wherein the smart card signals contains data stored inside the smart card, comprising:

a reading device coupled to the smart card for receiving and re-directing smart card signals; and a computer input/output (I/O) integrated circuit (IC), wherein the reading device is directly connected to the computer input/output I/O IC without an intermediate interface, the computer I/O IC picks up and processes the smart card signals from the reading device and then outputs smart card read signals.

2. The integrated system of claim 1, wherein the reading device further includes:

an engaging device having a plurality of contact points for engaging electrically with corresponding contact points on the smart card; and a matching circuit coupled to the engaging device and the computer I/O IC for connecting contact points on the smart card with internal circuitry of the computer I/O IC via the contact points on the engaging device.

3. The integrated system of claim 2, wherein the computer I/O IC includes a plurality of terminals for connecting with contact points on the smart card via the contact points on the engaging device.

4. The integrated system of claim 3, wherein the computer I/O IC further includes:

a signal conversion and control device for connecting a few of the terminals of the computer I/O IC to some of the contact points on the smart card so that smart card signals from the smart card can be read and transformed into a converted smart card signal; and a signal processor coupled to the signal conversion and control device for reading and processing the converted smart card signals and then outputting smart card read signals.

5. The integrated system of claim 4, wherein the computer I/O IC further includes a clock pulse generator for sending clock pulses from one of the computer I/O IC terminal to the smart card via a contact point on the smart card.

6. The integrated system of claim 1, wherein the reading device includes:

an engaging device having a plurality of contact points for engaging electrically with corresponding contact points on the smart card, wherein the engaging device further includes a switch for detecting the presence of a smart card and outputting an inserted smart card signal; and a matching circuit coupled to the engaging device and the computer I/O IC for connecting contact points on the smart card with internal circuitry of the computer I/O IC via the contact points on the engaging device.

7. The integrated system of claim 6, wherein the computer I/O IC further includes a plurality of terminals, a few of which are connected electrically with corresponding contact points on the smart card via the matching circuit, and at least one terminal is connected to the engaging device for receiving the inserted smart card signal.

8. The integrated system of claim 7, wherein the computer I/O IC further includes:

a signal conversion and control device for connecting a few of the terminals of the computer I/O IC to some of the contact points on the smart card so that smart card signals from the smart card can be read and transformed into a converted smart card signal; and a signal processor coupled to the signal conversion and control device and the engaging device for reading the converted smart card signals and the inserted smart card signal, such that when the inserted smart card signal is positive indicating the presence of a smart card, the converted smart card signals are processed to output smart card read signals.

9. The integrated system of claim 8, wherein the computer I/O IC further includes a clock pulse generator for sending clock pulses from one of the computer I/O IC terminals to the smart card via a contact point on the smart card.

10. An integrated smart card reader and computer input/output (I/O) integrated circuit (IC) system for reading smart card signals from a smart card, comprising:

a reading device for coupling to the smart card that includes an engaging device having a plurality of contact points for engaging electrically with a plurality of corresponding contact points on the smart card, further comprising a matching circuit connecting the contact points on the smart card with internal circuitry of the computer I/O IC via the contact points on the engaging device, and the reading device also including a switch for detecting the presence of the smart card and outputting a signal indicating the presence of the smart card;

a computer input/output (I/O) integrated circuit (IC) directly electrically connected to the reading device, having a plurality of terminals for connecting with a plurality of contact points on the smart card via a plurality of contact points on the engaging device, the computer I/O IC including a signal conversion and control device for converting smart card signals and forwarding the signals to a signal processor wherein the signal processor reads and processes the converted smart card signals and then outputs smart card read signals, and the computer I/O IC also including a clock pulse generator for sending clock pulses from one of the computer I/O IC terminals to the smart card via one of the contact points on the smart card.

11. The integrated system of claim 10, wherein the computer I/O IC further includes at least one terminal connected to the engaging device for receiving the signal indicating the presence of a smart card.

12. The integrated system of claim 11, wherein the computer I/O IC further includes the signal processor wherein when the signal indicating the presence of a smart card is positive, the converted smart card signals are processed to output smart card read signals.

* * * * *